(12) United States Patent
Han et al.

(10) Patent No.: US 11,529,012 B2
(45) Date of Patent: Dec. 20, 2022

(54) ELECTRIC PRESSURE COOKER

(71) Applicant: Instant Brands Inc., Ottawa (CA)

(72) Inventors: YuDe Han, Zhejiang (CN); Jiwei Wang, Ottawa (CA); Yi Qin, Ottawa (CA)

(73) Assignee: Instant Brands Inc., Ottawa (CA)

( * ) Notice: Subject to any disclaimer, the term of this patent is extended or adjusted under 35 U.S.C. 154(b) by 205 days.

(21) Appl. No.: 15/930,843

(22) Filed: May 13, 2020

(65) Prior Publication Data

US 2020/0359824 A1 Nov. 19, 2020

(30) Foreign Application Priority Data

May 13, 2019 (CN) .......................... 201910393997.4

(51) Int. Cl.
*A47J 27/09* (2006.01)
*A47J 27/00* (2006.01)

(52) U.S. Cl.
CPC ............. *A47J 27/09* (2013.01); *A47J 27/004* (2013.01)

(58) Field of Classification Search
CPC .......... A47J 27/004; A47J 27/09; A47J 27/08; A47J 27/06
USPC ......................................................... 99/324
See application file for complete search history.

(56) References Cited

U.S. PATENT DOCUMENTS

| | | | | |
|---|---|---|---|---|
| 2,592,992 A | * | 4/1952 | Abercrombie | A47J 27/09 137/524 |
| 3,908,111 A | * | 9/1975 | Du Bois | A47J 27/004 219/442 |
| 4,487,117 A | * | 12/1984 | Colley | A47J 36/38 99/341 |
| 5,193,524 A | * | 3/1993 | Loyd | A47J 27/58 126/374.1 |

(Continued)

FOREIGN PATENT DOCUMENTS

| | | |
|---|---|---|
| CN | 1126428 | 7/1996 |
| CN | 202154510 | 3/2012 |

(Continued)

OTHER PUBLICATIONS

Translation CN205267825 (Year: 2022).*

(Continued)

*Primary Examiner* — Ibrahime A Abraham
*Assistant Examiner* — Frederick F Calvetti
(74) *Attorney, Agent, or Firm* — Crowell & Moring LLP

(57) ABSTRACT

An electric pressure cooker comprises a body having outer pot and inner pot received therein and a lid covering the cooker body. The outer pot and the lid comprise matching teeth for lockingly engagement upon rotating the lid into closure. The cooker body comprises a pair of cooker handles extending outwardly from a sidewall thereof. The cooker handle comprises handgrip portion. The inner pot comprises inner pot body and a pair of inner pot handles connected thereto. The handgrip portion extends to align with or beyond the inner pot handle, so that a user holding the (Continued)

cooker handles will avoid gripping the inner pot handles. A vertical gap between the inner pot handle and the handgrip portion allows hand access. When the user is reaching for the inner pot handle the fingers will contact the cooker handle, thereby avoiding mistakenly gripping the cooker handle.

18 Claims, 6 Drawing Sheets

(56) References Cited

U.S. PATENT DOCUMENTS

| | | | | |
|---|---|---|---|---|
| 6,177,655 | B1* | 1/2001 | Toman | A47J 27/002 219/432 |
| 6,705,209 | B2* | 3/2004 | Yang | A47J 27/10 99/337 |
| 10,226,146 | B1* | 3/2019 | Zeder | A23L 5/13 |
| 11,197,572 | B2* | 12/2021 | Qin | A47J 36/10 |
| 2003/0010216 | A1* | 1/2003 | Yang | A47J 27/0802 99/337 |
| 2005/0173402 | A1* | 8/2005 | White | A47J 27/004 219/432 |
| 2007/0256683 | A1* | 11/2007 | Zimmerman | A47J 37/1285 126/369 |
| 2008/0169281 | A1* | 7/2008 | Borovicka | A47J 37/1295 219/441 |
| 2009/0087534 | A1* | 4/2009 | McLemore | A47J 37/1266 426/523 |
| 2010/0230398 | A1* | 9/2010 | Tynes | A47J 27/004 219/438 |
| 2014/0360384 | A1* | 12/2014 | Kim | A47J 27/0806 99/403 |
| 2016/0198883 | A1* | 7/2016 | Wang | A47J 27/0802 426/231 |
| 2019/0231131 | A1* | 8/2019 | Gill | A23L 5/17 |
| 2019/0231142 | A1* | 8/2019 | Gill | A47J 27/04 |
| 2019/0254474 | A1* | 8/2019 | Anthony | A47J 37/0641 |
| 2020/0060472 | A1* | 2/2020 | Gill | A47J 27/08 |
| 2020/0128997 | A1* | 4/2020 | Qin | A47J 36/10 |
| 2021/0121013 | A1* | 4/2021 | Elliston | A47J 27/086 |

FOREIGN PATENT DOCUMENTS

| | | |
|---|---|---|
| CN | 202198404 | 5/2012 |
| CN | 202761003 | 3/2013 |
| CN | 103169401 | 6/2013 |
| CN | 203153443 | 8/2013 |
| CN | 203290703 | 11/2013 |
| CN | 2034963400 | 3/2014 |
| CN | 203647077 | 6/2014 |
| CN | 204060548 | 4/2015 |
| CN | 204260545 | 4/2015 |
| CN | 204260546 | 4/2015 |
| CN | 204260547 | 4/2015 |
| CN | 20447611 | 7/2015 |
| CN | 204520275 | 8/2015 |
| CN | 204765114 | 11/2015 |
| CN | 105167592 | 12/2015 |
| CN | 204862626 | 12/2015 |
| CN | 105266600 | 1/2016 |
| CN | 205083263 | 3/2016 |
| CN | 205267796 | 6/2016 |
| CN | 205267825 | 6/2016 |
| CN | 205267826 | 6/2016 |
| CN | 205285941 | 6/2016 |
| CN | 205322076 | 6/2016 |
| CN | 205338619 | 6/2016 |
| CN | 205649384 | 10/2016 |
| CN | 205697155 | 11/2016 |
| CN | 205758306 | 12/2016 |
| CN | 206183012 U | 5/2017 |
| CN | 106108627 | 11/2018 |
| CN | 106108631 | 11/2018 |
| CN | 208709331 U | 4/2019 |

OTHER PUBLICATIONS

Translation CN205267826 (Year: 2022).*
Translation CN206183012 A (Year: 2022).*
Translation CN206183012 B (Year: 2022).*
Search Report for Chinese Patent Application No. 2019103939974 dated Jan. 26, 2021, 1 pg.
Office Action with English Translation for Chinese Patent Application No. 201910393997.4 dated Feb. 2, 2021, 9 pages.
Office Action with English Translation for Chinese Patent Application No. 201910393997.4 dated May 26, 2021, 11 pages.

* cited by examiner

ELECTRIC PRESSURE COOKER

CROSS-REFERENCE TO RELATED APPLICATIONS

This application claims priority to Chinese Patent Application 201910393997.4 filed on May 13, 2019, the entire contents of which are incorporated herein by reference.

TECHNICAL FIELD OF THE INVENTION

The present invention relates generally to the field of small kitchen appliances, and more particularly to an electric pressure cooker.

BACKGROUND OF THE INVENTION

Electric pressure cookers are commonly found household appliances. Currently, the inner pot of an electric pressure cooker has a periphery rim. A user will have to hold this periphery rim by hand in order to retrieve the inner pot from the electric pressure cooker. However, the periphery rim is difficult to hand-hold, and as such it can be cumbersome or inconvenient for the users to retrieve the inner pot.

SUMMARY OF THE INVENTION

The present invention provides an electric pressure cooker enabling and allowing easy and convenient retrieval of the inner pot thereof.

In accordance with one aspect of the present disclosure, there is provided an electric pressure cooker, comprising: a cooker body comprising an outer pot, an inner pot removably receivable within the outer pot, and a lid assembly for covering the cooker body; wherein the outer pot comprises a plurality of cooker teeth, the lid assembly comprises a plurality of lid teeth corresponding with the cooker teeth, the cooker teeth and the lid teeth are constructed and arranged to lockingly engage with each other upon a rotation of the lid assembly into a closed position relative to the cooker body; wherein the cooker body comprises a pair of cooker handles extending outwardly from a sidewall of the cooker body, the cooker handle comprises a handgrip portion for lifting or moving the cooker body; wherein the inner pot comprises an inner pot body and a pair of inner pot handles connected to the inner pot body; wherein the handgrip portion extends from the cooker body to at least substantially align with the inner pot handle or beyond the inner pot handle, so that a user holding the cooker handles will avoid mistakenly handling or gripping the inner pot handles; wherein the inner pot handle is spaced apart from the handgrip portion in a vertical direction so as to define a gap between the inner pot handle and the handgrip portion for allowing fingers of a user to be received therein, such that when the user is reaching for the inner pot handle, the fingers will inevitably contact the cooker handle or a part thereof, thereby providing the user a confirmation or assurance of correct handling without mistakenly gripping the cooker handle.

In accordance with some embodiments of the present disclosure, the vertical gap between the inner pot handle and the handgrip portion has a width of about 10 mm to about 13 mm.

In accordance with some embodiments of the present disclosure, the handgrip portion comprises a slope portion for ease of handing by hand, wherein a gap between a distal end of the slope portion and the inner pot handle is about 11.5 mm to about 12.5 mm, and wherein a gap between a proximal end of the slope portion and the inner pot handle is about 10.5 mm to about 11.5 mm.

In accordance with some embodiments of the present disclosure, the handgrip portion is substantially flat in shape, and the gap between the inner pot handle and the handgrip portion has a width that is slightly narrower than an average thickness of an adult finger.

In accordance with some embodiments of the present disclosure, the cooker handle comprises a pair of sidewalls extending upwardly from opposing sides of the handgrip portion, respectively, wherein the handgrip portion and the pair of sidewalls enclose or form a receiving groove, and wherein the inner pot handle is constructed and arranged to be received or fitted within the receiving groove.

In accordance with some embodiments of the present disclosure, the inner pot handle comprises a connecting member fastened to the inner pot body, and a heat insulation member coupled to the connecting member, the heat insulation member is assembled to or integrally formed with the connecting member, wherein the outer pot comprises a cavity for receiving the inner pot therein, and a recess portion in communication with the cavity, wherein the connecting member is constructed and arranged to extend through the recess portion, and wherein the heat insulation member is disposed outside of the outer pot.

In accordance with some embodiments of the present disclosure, the cooker body comprises a base, an outer shell mounted to the base, and a middle board covering at least a portion of the outer shell, wherein the outer pot is mounted to the base, the outer shell and the middle board, and wherein the cooker handles are disposed on the middle board.

In accordance with some embodiments of the present disclosure, the heat insulation member comprises an upwardly concaved recess portion disposed on a bottom wall of the heat insulation member, the recess portion having such a tapering shape that a center portion of the recess portion has a larger depth relative to the bottom wall of the heat insulation member than a peripheral portion of the recess portion, wherein the tapering shape is formed to be substantially similar to a shape of a fingertip so as to allow easy access by hand.

In accordance with some embodiments of the present disclosure, the connecting member comprises a first attachment portion for snugly attaching to the inner pot body, a connecting portion substantially laterally or horizontally extending from the first attachment portion, and a second attachment portion extending from the connecting portion; wherein the connecting portion comprises an upper portion disposed in proximity to the inner pot body and a lower portion disposed in proximity to the heat insulation member; wherein the upper portion is constructed and arranged to provide clearance room for the outer pot or accommodate the structure thereof, and the lower portion is constructed and arranged to provide clearance room for the lid assembly or accommodate the structure thereof.

In accordance with some embodiments of the present disclosure, the first attachment portion is substantially arc-shaped so as to be in better conformity with the inner pot body.

In accordance with some embodiments of the present disclosure, the second attachment portion is constructed and arranged to bendingly extend from the connecting portion in an upward direction so that the heat insulation member is disposed at an elevated position, thereby allowing the receiving groove of the cooker handle to be constructed with a relatively shallower depth.

An electric pressure cooker in accordance with example embodiments of the present disclosure comprises an inner pot having inner pot handles disposed thereon thereby enabling and allowing easy and convenient retrieval of the inner pot from the electric pressure cooker.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
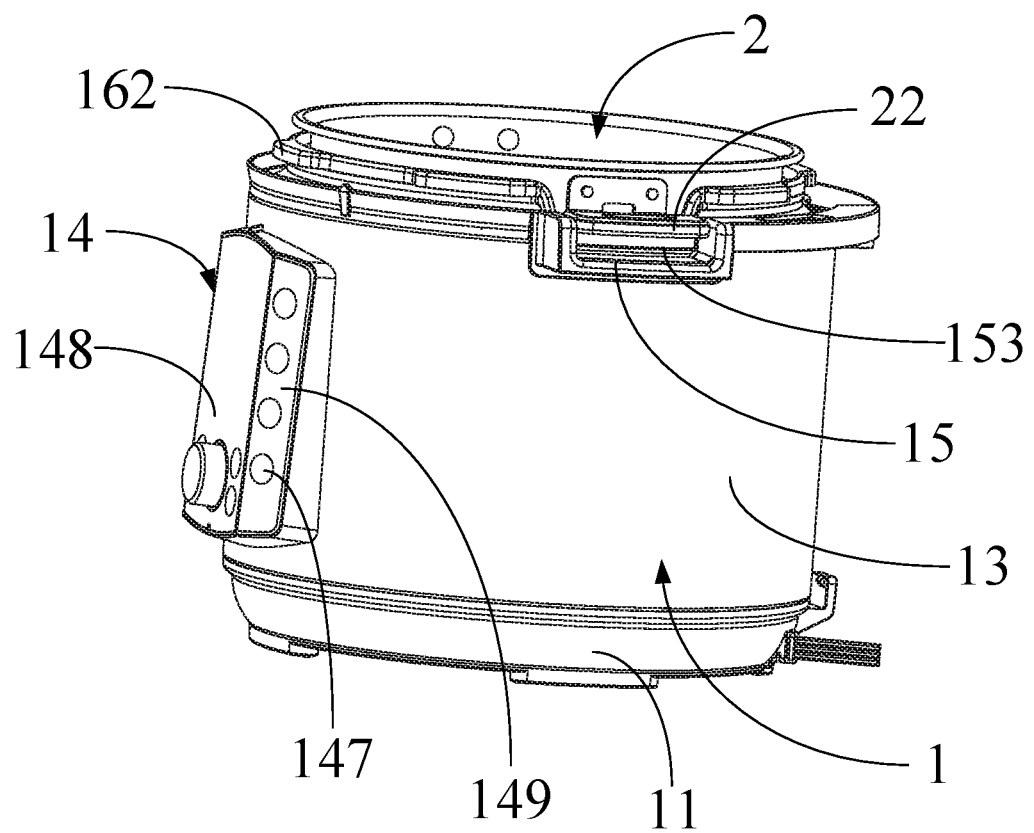
FIG. 1 is a perspective view illustrating an electric pressure cooker in accordance with an example embodiment of the present disclosure, without showing lid assembly.
Figure 2:
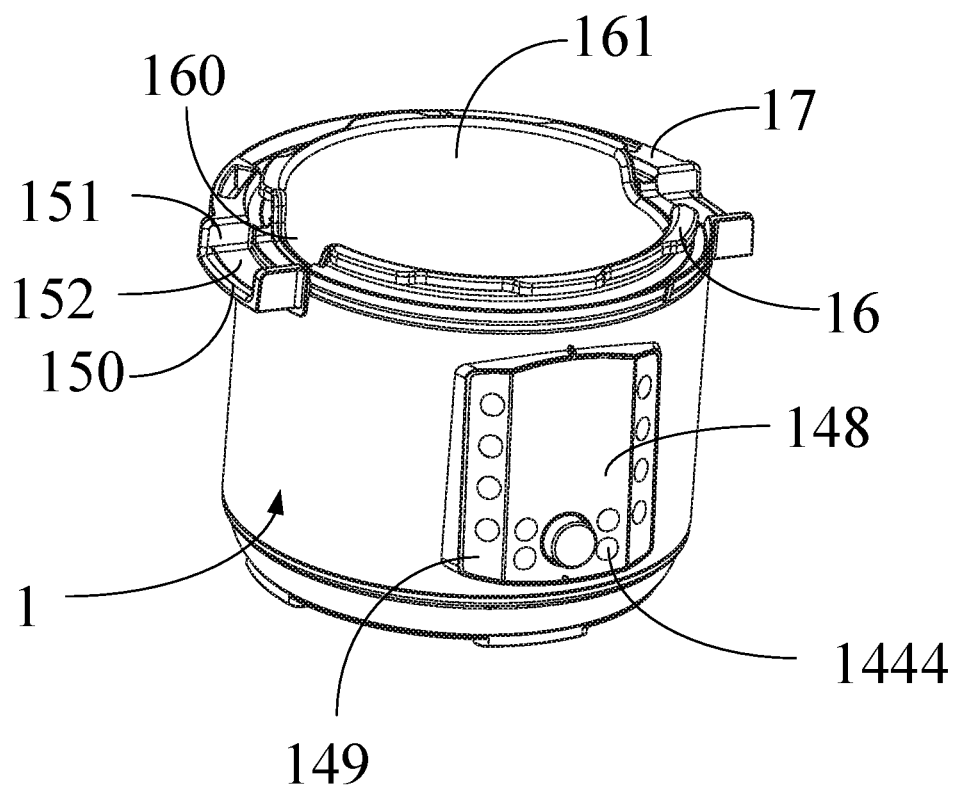
FIG. 2 is a perspective view of a cooker body of the electric pressure cooker of FIG. 1.
Figure 3:
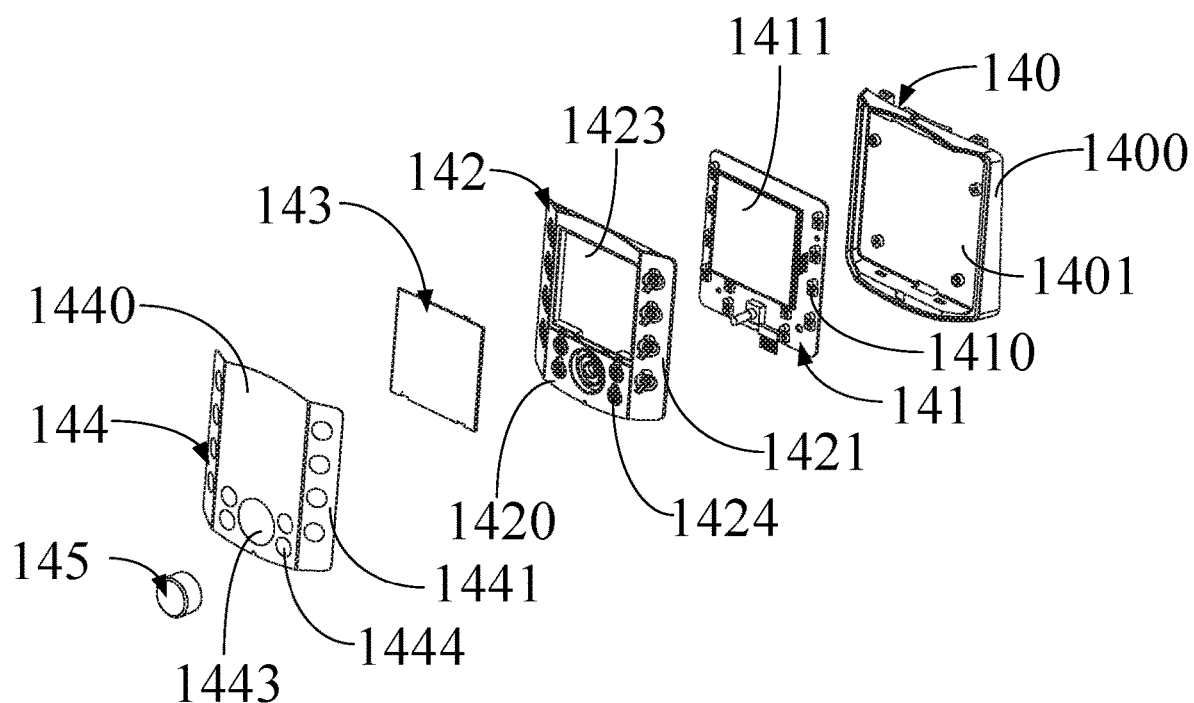
FIG. 3 is an exploded view of an operation panel of the electric pressure cooker of FIG. 1.
Figure 4:
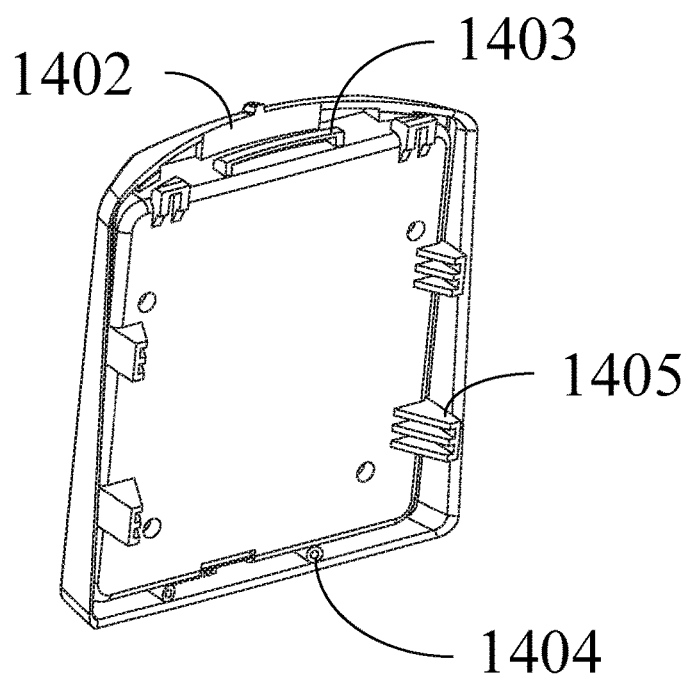
FIG. 4 is a perspective view of the operation panel of FIG. 3.

Exemplary embodiments will be described in detail herein, examples of which are illustrated in the accompanying drawings. When the following description refers to the accompanying drawings, unless otherwise indicated, the same numbers in different drawings represent the same or similar elements. The embodiments described in the following exemplary embodiments do not represent all embodiments consistent with the present invention. Instead, they are merely examples of devices consistent with some aspects of the present disclosure as detailed in the appended claims.

The terms used in the present application are for the purpose of describing particular embodiments only, and are not intended to limit the present application. Unless otherwise defined, technical terms or scientific terms used herein should have the ordinary meanings as understood by those having ordinary skilled in the art to which the invention pertains. The words "first", "second" and similar terms used in the specification and claims of the present application do not denote any order, quantity, or importance, but are merely used to distinguish different components. Similarly, the words "a" or "an" and the like do not denote a quantity limitation, but mean that there is at least one. "Multiple" or "several" means two or more. Unless otherwise indicated, the terms "front", "rear", "lower" and/or "upper" and the like are used for convenience of description and are not limited to one location or one spatial orientation. "Including" or "comprising" and similar words mean that the elements or objects that appear before "including" or "comprising" encompass the elements or objects listed after "including" or "comprising" and their equivalents, and do not exclude other elements or objects. The words "connection" or "connected" and the like are not limited to physical or mechanical connections, but may include electrical connections, whether direct or indirect. As used herein and in the appended claims, the singular forms "a", "said", and "the" are intended to include the plural forms unless the context clearly dictates otherwise. It should also be understood that, as used herein, the term "and/or" refers to and includes any or all possible combinations of one or more of the associated listed items.

Referring to FIGS. 1-4 and FIG. 9, an electric pressure cooker according to an example embodiment of the present disclosure comprises a cooker body 1, an inner pot 2 removably receivable within the cooker body 1, and a lid assembly 3 for covering the cooker body 1. In some embodiments, the cooker body 1 comprises a base 11, a substantially cylindrical or arc-shaped outer shell 13 mounted to the base 11, a middle board 17 covering at least a part of a top portion of the outer shell 13, an outer pot 16 mounted to the base 11, the outer shell 13 and the middle board 17, an inner pot 2 receivable within the outer pot 16, and an operation panel 14 secured to the outer shell 13. The outer pot 16 comprises one or more cooker teeth 162, whereas the lid assembly 3 comprises one or more lid teeth (not shown). When the lid assembly 3 is covering the cooker body, the lid assembly 3 is operable to be rotated to a closed position wherein the cooker teeth 162 and the corresponding lid teeth are lockingly engaged in a vertical direction such that the lid assembly 3 cannot be lifted from the cooker body 1. In some embodiments, the outer shell is made of metals or metallic materials.

In some embodiments, the operation panel 14 comprises a substantially flat display panel 148 and a control panel 149 coupled to at least one side of the display panel 148 and inclinedly disposed or oriented relative to the display panel 148; wherein the control panel 149 is inclinedly disposed or oriented such that an overall shape of the operation panel 14 at least partially approximates that of the cylindrical or arc-shaped shell 13; and wherein the control panel 149 comprises at least one control key 147 disposed thereon for conveniently operating the electric pressure cooker. Advantageously, such a design provides an increased area of the display panel 148, thereby providing a bigger displaying area without substantially enlarging the dimensions of the operation panel 14.

In some embodiments, the operation panel 14 comprises a rear installation panel 140 secured to the outer shell 13, an electric circuit board 141 secured to the rear installation panel 140, a button panel 142 disposed to cover the electric circuit board 141, a transparent protective board 143 secured to the button panel 142, a decorative film 144 covering the button panel 142, and a rotary knob 145 assembled to the button panel 142 and extending through the decorative film 144.

In some embodiments, the rear installation panel 140 comprises a panel portion 1400 comprising a receptacle 1401 disposed thereon, a first position-limiting member 1402 extending from the panel portion 1400, a second position-limiting member 1403 extending from the panel portion 1400, at least one fixing post 1404, and a plurality of positioning protrusions 1405. The electric circuit board 141 and the button panel 142 are disposed within the receptacle 1401. The first position-limiting member 1402 and the second position-limiting member 1403 are disposed at an upper portion of the rear installation panel 140, the at least one fixing post 1404 is disposed at a lower portion of the rear installation panel 140, and one or more positioning protrusions 1405 are disposed on a left side and a right side of the rear installation panel 140, respectively.

In some embodiments, the electric circuit board 141 can be fastened or secured to the rear installation panel 140 using a fastener such as a screw, or similar devices known in the art. In some embodiments, the operation panel 14 comprises a display screen 1411 connected to the electric circuit board 141, and a plurality of push buttons 1410 operable for push actions.

In some embodiments, the button panel 142 comprises a substantially flat base portion 1420 constructed and arranged to form or provide a shape for the substantially flat display panel 148, and a pair of inclined portions 1421 inclinedly extending from a left side and a right side of the base portion 1420, respectively; wherein the inclined portions 1421 are constructed and arranged to form or provide a shape for the inclinedly disposed control panel 149. The base portion 1420 comprises a window 1423 disposed thereon for accommodating the display screen 1411. The transparent protective board 143 is assembled or secured to the window 1423 or a portion thereof so as to protect the display screen 1411. The base portion 1420 and the inclined portions 1421 comprises a plurality of push portions 1424 correspondingly disposed to match with the plurality of push buttons 1410 of the electric circuit board 141, such that the push buttons 1410 can be triggered by pressing or pushing the corresponding push portions 1424. The rotary knob 145 is assembled to the base portion 1420 and is disposed below the window 1423. In some embodiments, one or more of the push portions 1424 are distributed on a left side and a right side of the rotary knob 145, respectively; one or more of the push portions 1424 are distributed on a left side and a right side of the window 1423, respectively; and one or more of the push portions 1424 are disposed on the inclined portions 1421.

In some embodiments, the decorative film 144 is configured to have a shape that is substantially similar to that of the button panel 142, the decorative film 144 comprising a body portion 1440 for covering the base portion 1420, and one or more extension portions 1441 for covering the one or more inclined portions 1421; wherein the body portion 1440 and the extension portions 1441 each comprises one or more protrusion portions 1444 corresponding to or matching with the push portions 1424, so as to protect the push portions 1424. The body portion 1440 comprises a through-aperture 1443 for allowing the rotary knob 145 to extend through. The decorative film 144 is constructed using suitable materials and arranged to function as a water resistant and dust resistant layer while being aesthetically pleasing. As such, the at least one control key 147 comprises a push portion 1424 disposed on the button panel 142 and a corresponding protrusion portion 1444 disposed on the decorative film 144.

Figure 5:
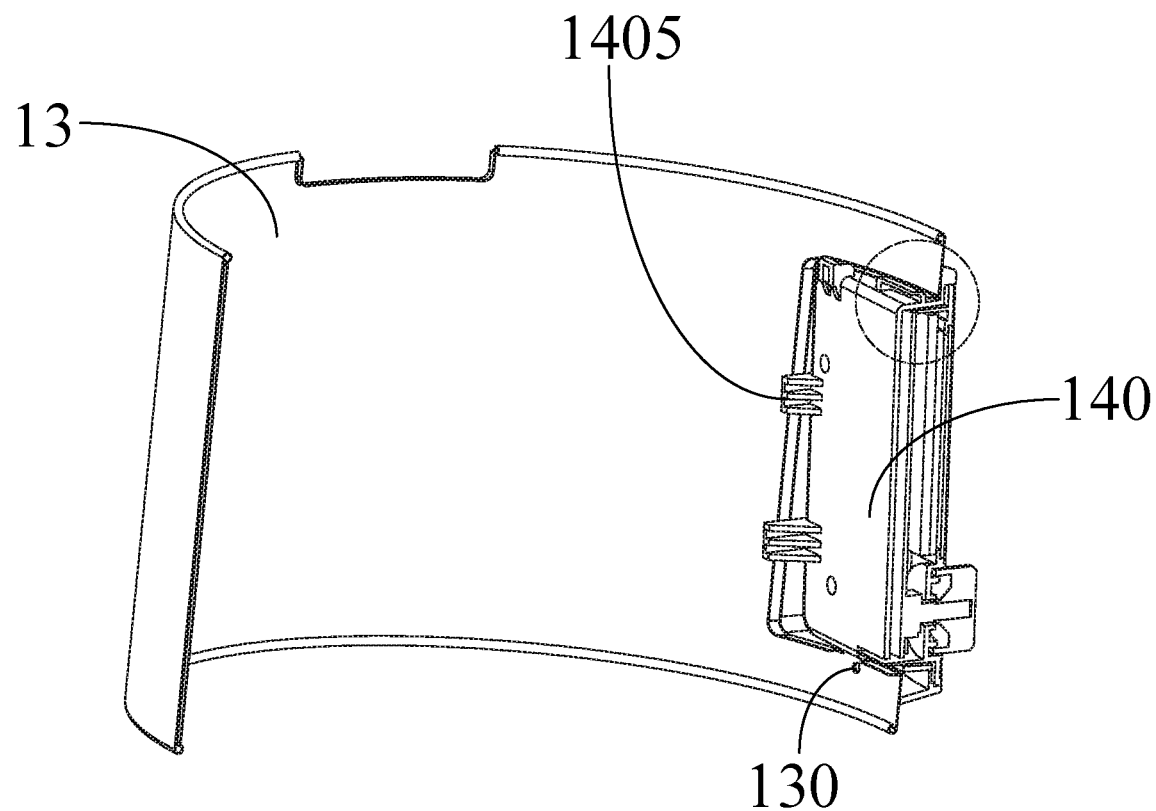
FIG. 5 is a schematic sectional view of the operation panel of FIG. 4 assembled with an outer shell of the electric pressure cooker of FIG. 1.
Figure 6:
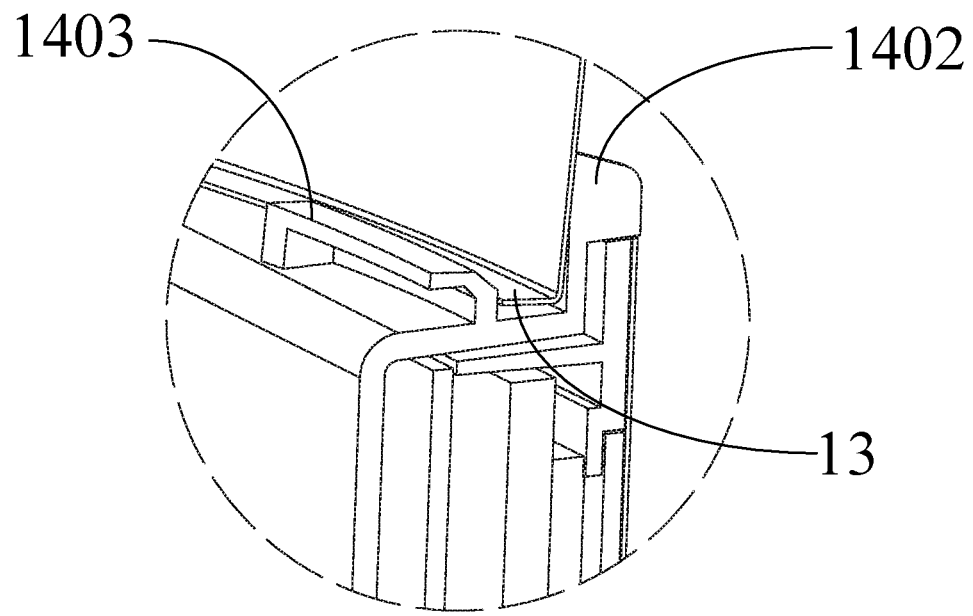
FIG. 6 is a magnified view of the circled area of FIG. 5.
Figure 7:
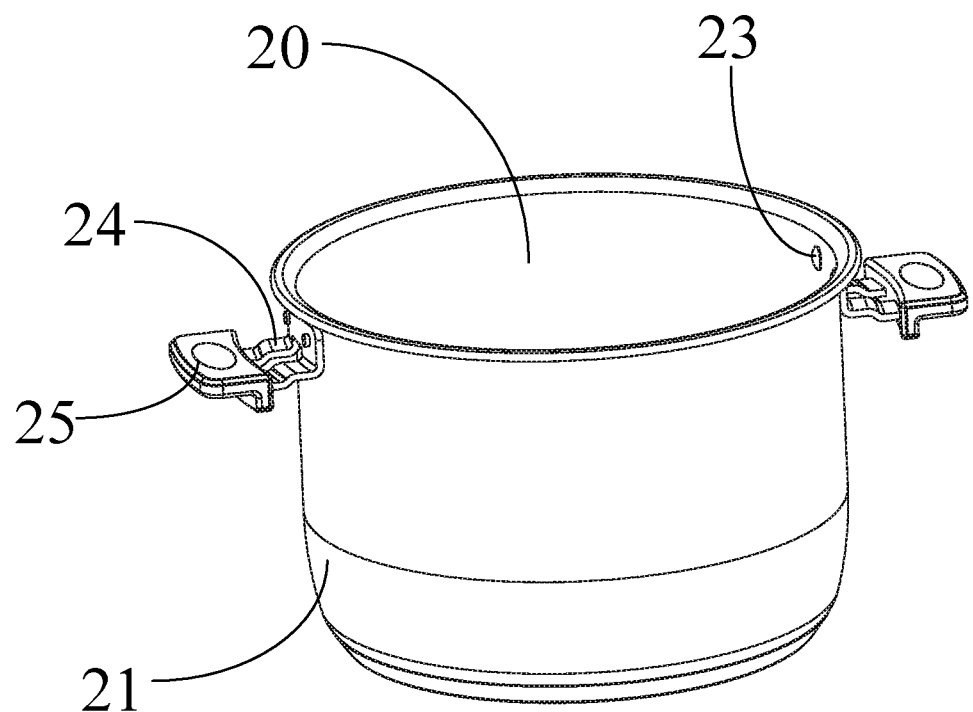
FIG. 7 is a perspective view of an inner pot shown in FIG. 2.

Referring now to FIGS. 5-6, in some embodiments, the outer shell 13 comprises an opening (not numbered) and a flange portion 131 at least partially enclosing the opening of the outer shell 13. The operation panel 14 is fastened or assembled to the opening (not numbered). In such operation, for example, the operation panel 14 can be brought closer to the opening and pushed upwardly toward the opening in a slant direction relative to the opening, until the flange portion 131 is received between the first position-limiting portion 1402 and the second position-limiting portion 1403. Then the operation panel 14 can be pressed or pushed toward the outer shell 13, so that the positioning protrusions 1405 of the operation panel 14 are properly aligned with a periphery or border of the opening, and are pushed into the opening against the periphery or border thereof. Next, a fastener such as a screw or other similar devices (not shown) can be used to secure an engagement between a mounting aperture 130 of the outer shell 13 and the fixing post 1404 from an interior side of the outer shell 13. For example, once the fixing post 1404 is aligned with and received within the mounting aperture 130, the fastener can be inserted into the mounting aperture 130 and screwed into the fixing post 1404 so as to securely fasten the operation panel 14 to the outer shell 13. Advantageously, the tight fitting between the positioning protrusions 1405 and the flange portion 131 effectively enhanced the stability of the operation panel 14.

Referring to FIGS. 1-2 and FIGS. 7-10, in some embodiments, the middle board 17 is disposed to substantially enclose or surround the outer pot 16 or a portion thereof. The outer pot 16 comprises a cavity 161 and a recess portion 160 in communication with the cavity 161. The inner pot 2 is operable to be removably received within the cavity 161 of the outer pot 16 for food cooking. In some embodiments, the middle board 17 comprises a pair of cooker handles 15 disposed exterior to the cavity 161 and extending outwardly from a sidewall of the cooker body 1, for lifting or moving the cooker body 1. The cooker handle 15 comprises a substantially flat handgrip portion 150 and a pair of sidewalls 151 extending upwardly from opposing sides of the handgrip portion 150, respectively, wherein the handgrip portion 150 and the pair of sidewalls 151 enclose or form a receiving groove 152.

In some embodiments, the inner pot 2 comprises an inner pot body 21 defining a cooking chamber 20, and a pair of inner pot handles 22 connected to the inner pot body 21. The inner pot handle 22 is constructed and arranged to fit within the receiving groove 152 when the inner pot 2 is received within the outer pot 16, and allows a user to lift the inner pot 2 out of the outer pot 16. In some embodiments, the handgrip portion 150 extends outwardly from the cooker body 1 to substantially align or overlap with the inner pot handle 22. In some embodiments, the handgrip portion 150 extends from the cooker body 1 beyond the inner pot handle 22, so that a user holding the cooker handles 15 will not mistakenly handle or grip the inner pot handles 22. In some embodiments, the inner pot handle 22 comprises a connecting member 24 fastened to the inner pot body 21 by a rivet 23 or similar devices, and a heat insulation member 25 coupled to the connecting member 24. In some embodiments, the heat insulation member 25 is assembled or attached to the connecting member 24, whereas in some other embodiments, the heat insulation member 25 is integrally formed with the connecting member 24 as a unitary piece. In some embodiments, the connecting member 24 is constructed and arranged to extend through the recess portion 160 of the outer pot 16, and the heat insulation member 25 is disposed outside of the outer pot 16.

In some embodiments, the inner pot handle 22 is spaced apart from the handgrip portion 150 for a predetermined width in a vertical direction when the inner pot 2 is placed within the outer pot 16, so as to define a gap 153 between the inner pot handle 22 and the handgrip portion 150 for allowing fingers of a user to be received therein. Advantageously, when a user is reaching for the inner pot handles 22 for lifting or handling the inner pot 2, his/her fingers will inevitably contact the cooker handles 15 or a part thereof, so as to provide the user the confirmation or assurance that he/she did not mistakenly grip the cooker handles 15. In some embodiments, the gap 153 has a width that is slightly narrower than an average thickness of an adult finger, for example, the gap width can be about 10 mm to about 13 mm, or within a similarly suitable range, thereby allowing convenient handling of the inner pot 2 while avoid mishandling of the inner pot 2.

Figure 10:
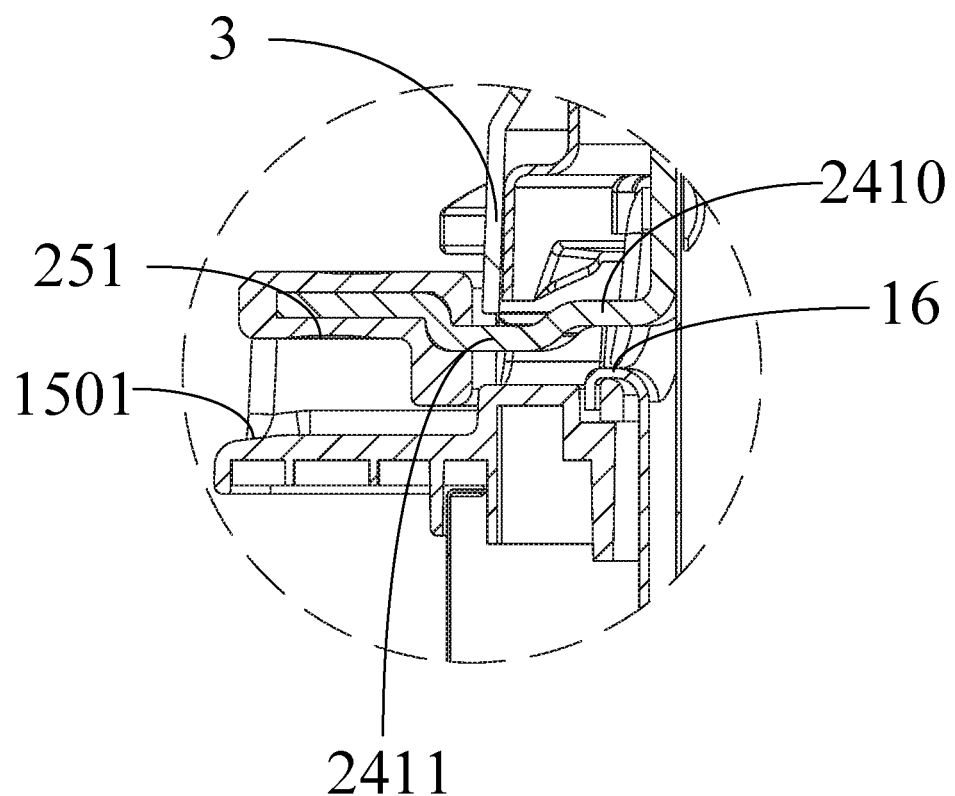
FIG. 10 is a magnified view of the circled area of FIG. 9.

Referring now to FIG. 10, in some embodiments, the handgrip portion 150 comprises a slope portion 1501 for ease of handing by hand, wherein a gap between a distal end of the slope portion 1501 and the inner pot handles 22 is about 11.5 mm to about 12.5 mm, and wherein a gap between a proximal end of the slope portion 1501 and the inner pot handles 22 is about 10.5 mm to about 11.5 mm.

In some embodiments, the heat insulation member 25 is made of plastic rubber materials or other similarly suitable materials so as to provide heat insulation from the connecting member 24 or prevent hand scalds or burns by the connecting member 24. In some embodiments, the heat insulation member 25 comprises an upwardly concaved recess portion 251 disposed on a bottom wall of the heat insulation member 25, wherein the recess portion 251 has a tapering shape such that a center portion of the recess portion 251 has a larger depth relative to the bottom wall of the heat insulation member 25 than a peripheral portion of the recess portion 251. Such tapering shape can be formed to be substantially similar to the shape of a fingertip so as to allow easy access by hand.

Figure 8:
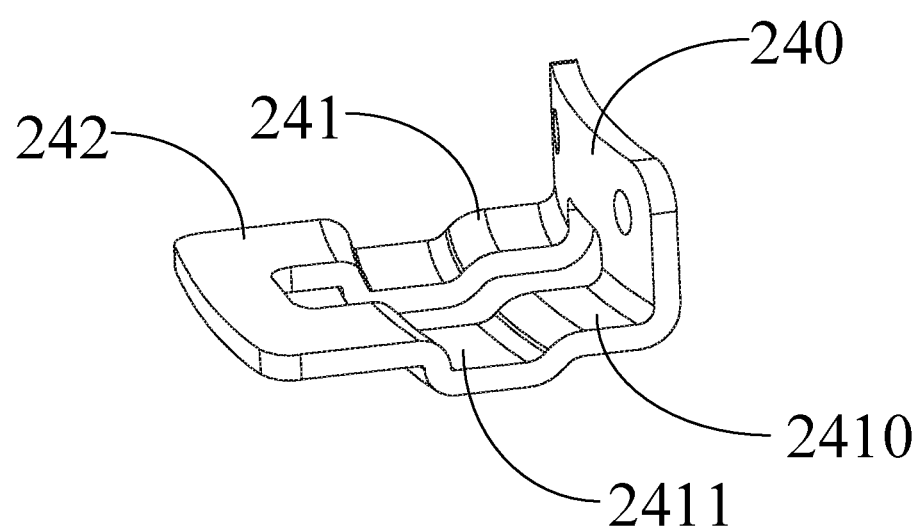
FIG. 8 is a perspective view of a connecting member of the inner pot of FIG. 7.
Figure 9:
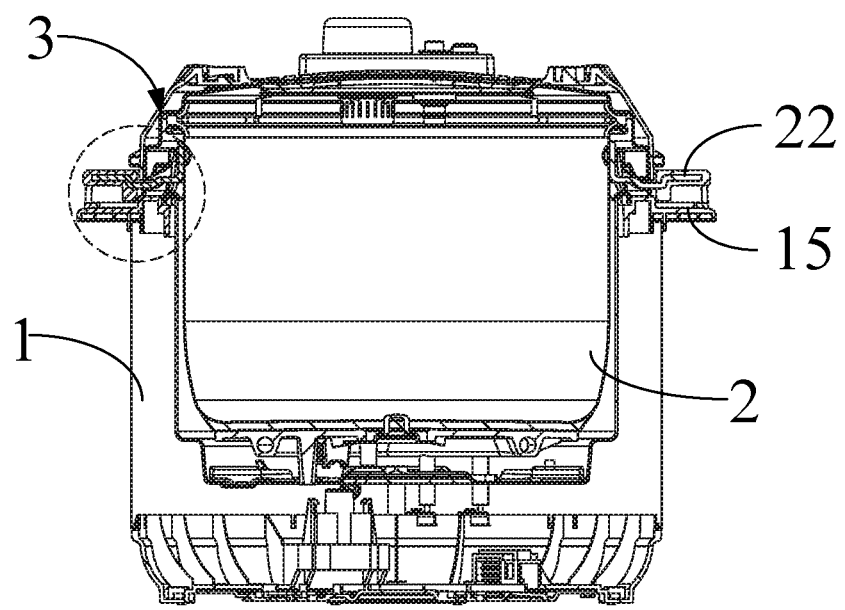
FIG. 9 is a schematic sectional view of an electric pressure cooker in accordance with an example embodiment of the present disclosure.

Referring to FIGS. 8 and 10, in some embodiments, the connecting member 24 is made of metals or metallic materials, and comprises a first attachment portion 240 constructed and arranged to snugly fasten or attach to the inner pot body 21, a connecting portion 241 substantially laterally or horizontally extending from the first attachment portion 240, and a second attachment portion 242 extending from the connecting portion 241. In some embodiments, the first attachment portion 240 is substantially arc-shaped so as to be in better conformity with the inner pot body 21. In some embodiments, the second attachment portion 242 is generally flat in shape or formed as a panel-like structure for secure attachment to the heat insulation member 25. In some embodiments, the heat insulation member 25 is integrally formed with the second attachment portion 242 as a unitary piece, whereas in some embodiments, the heat insulation member 25 is assembled or attached to the second attachment portion 242. In some embodiments, the connecting portion 241 comprises an upper portion 2410 disposed in proximity to the inner pot body 21 and a lower portion 2411 disposed in proximity to the heat insulation member 25; wherein the upper portion 2410 is constructed and arranged to provide clearance room for the outer pot 16 or accommodate the structure thereof, and the lower portion 2411 is constructed and arranged to provide clearance room for the lid assembly 3 or accommodate the structure thereof. In some embodiments, the second attachment portion 242 is constructed and arranged to bendingly extend from the connecting portion 241 in an upward direction and is disposed at raised position relative to the connecting portion 241 or a portion thereof, so that the heat insulation member 25 is disposed at an elevated position, thereby allowing the receiving groove 152 of the cooker handle 15 to be constructed with a relatively shallower depth, when comparing with the embodiments where the second attachment portion 242 is generally flat.

A cooker body 1 of an electric pressure cooker in accordance with example embodiments of the present disclosure comprises a cooker handle 15 disposed thereon, whereas the inner pot 2 comprises an inner pot handle 22 correspondingly disposed above the cooker handle 15 for retrieving the inner pot 2; wherein the cooker handle 15 comprises a insulation member 25 for preventing hand scalds or burns. The inner pot handle 22 and the handgrip portion 150 of the cooker handle 15 define a gap 153 therebetween, wherein the gap 153 has a width that is slightly narrower than an average thickness of an adult finger, so that when a hand of a user is received in the gap 153 for retrieving the inner pot 2, the hand will contact the handgrip portion 150, thereby reminding the user that it is the inner pot 2 that is currently being handled, and thereby preventing mishandling of the inner pot 2 or unintended handling thereof.

The foregoing description is of preferred embodiments of the present application only, and is not intended to limit the present application in any way. Without departing from the technical scope of the present application, a person of ordinary skills in the art may make certain modifications or equivalent substitutions to the disclosed technical contents. Any simple modifications, equivalent changes or equivalent substitutions made to the above embodiments in accordance with the technical principle of the present application are still within the scope of the technical solutions of the present application.

What is claimed is:

1. An electric pressure cooker comprising: a cooker body comprising an outer pot; an inner pot removably receivable within the outer pot; a lid assembly for covering the cooker body; and, wherein the outer pot comprises a plurality of cooker teeth, the lid assembly comprises a plurality of lid teeth corresponding with the cooker teeth, and the cooker teeth and the lid teeth are constructed and arranged to lockingly engage with each other upon a rotation of the lid assembly into a closed position relative to the cooker body; wherein the cooker body comprises a pair of cooker handles extending outwardly from a sidewall of the cooker body, the cooker handles comprise a handgrip portion for lifting or moving the cooker body, and a pair of sidewalls extending upwardly from opposing sides of the handgrip portion, the handgrip portion and the pair of sidewalls forming a receiving groove open at an outer radial end thereof; wherein the inner pot comprises an inner pot body and a pair of inner pot handles connected to the inner pot body, the inner pot handles being constructed and arranged to be received between the sidewalls within the receiving grooves; wherein the handgrip portion extends from the cooker body to at least substantially align with the inner pot handle or beyond the inner pot handle; and wherein the inner pot handle is spaced apart from the handgrip portion in a vertical direction so as to define a gap between the inner pot handle and the handgrip portion for allowing fingers of a user to be received therein through the open outer radial end of the receiving groove, wherein the inner pot handle comprises a connecting member fastened to the inner pot body, and a heat insulation member coupled to the connecting member, the heat insulation member is assembled to or integrally formed with the connecting member; and the heat insulation member is disposed outside of the outer pot, wherein the connecting member comprises a first attachment portion for attaching to the inner pot body, a connecting portion substantially laterally or horizontally extending from the first attachment portion, and a second attachment portion extending from the connecting portion; the connecting portion comprises an upper portion disposed in proximity to the inner pot body and a lower portion disposed in proximity to the heat insulation member; the upper portion is constructed and arranged to provide clearance room for the outer pot or accommodate the structure thereof; and the lower portion is constructed and arranged to provide clearance room for the lid assembly or accommodate the structure thereof.

2. The electric pressure cooker of claim 1, wherein the vertical gap between the inner pot handle and the handgrip portion has a width of about 10 mm to about 13 mm.

3. The electric pressure cooker of claim 1, wherein:
the handgrip portion comprises a slope portion for ease of handling by hand;
a gap between a distal end of the slope portion and the inner pot handle is about 11.5 mm to about 12.5 mm; and
a gap between a proximal end of the slope portion and the inner pot handle is about 10.5 mm to about 11.5 mm.

4. The electric pressure cooker of claim 1, wherein:
the handgrip portion is flat in shape; and
the gap between the inner pot handle and the handgrip portion has a width of about 10 mm to about 13 mm.

5. The electric pressure cooker of claim 1, wherein:
the cooker body comprises a base, an outer shell mounted to the base, and a cover element covering at least a portion of the outer shell;
the outer pot is mounted to the base, the outer shell and the cover element; and
the cooker handles are disposed on the cover element.

6. The electric pressure cooker of claim 1, wherein the heat insulation member comprises:
an upwardly concaved recess portion disposed on a bottom wall of the heat insulation member;
the recess portion having such a tapering shape that a center portion of the recess portion has a larger depth relative to the bottom wall of the heat insulation member than a peripheral portion of the recess portion; and
wherein the tapering shape is formed to be substantially similar to a shape of a fingertip so as to allow easy access by hand.

7. An electric pressure cooker comprising:
a cooker body comprising an outer pot;
an inner pot removably receivable within the outer pot; and,
a lid assembly for covering the cooker body;
wherein the outer pot comprises a plurality of cooker teeth, the lid assembly comprises a plurality of lid teeth corresponding with the cooker teeth, and the cooker teeth and the lid teeth are constructed and arranged to lockingly engage with each other upon a rotation of the lid assembly into a closed position relative to the cooker body;
wherein the cooker body comprises a pair of cooker handles extending outwardly from a sidewall of the cooker body, the cooker handles comprise a handgrip portion for lifting or moving the cooker body, and a pair of sidewalls extending upwardly from opposing sides of the handgrip portion, the handgrip portion and the pair of sidewalls forming a receiving groove open at an outer radial end thereof for allowing fingers of a user to be inserted through the open outer end;
wherein the inner pot comprises an inner pot body and a pair of inner pot handles connected to the inner pot body, the inner pot handles being constructed and arranged to be received between the sidewalls within the receiving grooves;
wherein the handgrip portion extends from the cooker body to at least substantially align with the inner pot handle or beyond the inner pot handle; and
wherein each of inner pot handles comprises a metal connecting member and a heat insulation member coupled to the metal connecting member, the metal connecting member comprising a first attachment portion, an upper connection, a lower connection and a second attachment portion connected in turn, the first attachment portion extending substantially vertically and being attached to a side wall of the inner pot body, the upper connection extending substantially horizontally from a lower end of the first attachment portion to provide clearance room for the outer pot, the lower connection being bended from the upper connection to provide clearance room for the lid assembly, the second attachment portion being disposed in a horizontal surface higher than the lower connection and being covered by the heat insulation member.

8. The electric pressure cooker of claim 7, wherein the second attachment portion is integrally formed with the heat insulation member, and wherein the heat insulation member is disposed outside of the outer pot.

9. The electric pressure cooker of claim 8, wherein the inner pot handle is spaced apart from the handgrip portion in a vertical direction so as to define a gap between the inner pot handle and the handgrip portion for allowing fingers of the user to be received therein.

10. The electric pressure cooker of claim 9, wherein the vertical gap between the inner pot handle and the handgrip portion has a width of about 10 mm to about 13 mm.

11. The electric pressure cooker of claim 9, wherein:
the handgrip portion comprises a slope portion for ease of handling by hand;
a gap between a distal end of the slope portion and the inner pot handle is about 11.5 mm to about 12.5 mm; and
a gap between a proximal end of the slope portion and the inner pot handle is about 10.5 mm to about 11.5 mm.

12. The electric pressure cooker of claim 9, wherein the handgrip portion is flat in shape, and the gap between the inner pot handle and the handgrip portion has a width of about 10 mm to about 13 mm.

13. The electric pressure cooker of claim 1, wherein the outer pot comprises a cavity for receiving the inner pot therein, and a pair of recess portions in communication with the cavity and the outer radial ends of the receiving grooves; and, the inner pot handles are constructed and arranged to extend through the recess portions toward the outer radial ends of the receiving grooves.

14. The electric pressure cooker of claim 9, wherein the outer pot comprises a cavity for receiving the inner pot therein, and a pair of recess portions in communication with the cavity and the outer radial ends of the receiving grooves; and, the inner pot handles are constructed and arranged to extend through the recess portions toward the outer radial ends of the receiving grooves.

15. The electric pressure cooker of claim 13, wherein the inner pot handles are accessible by the user via the open outer radial ends of the receiving grooves when the lid assembly is in the closed position relative to the cooker body.

16. The electric pressure cooker of claim 14, wherein the inner pot handles are accessible by the user via the open outer radial ends of the receiving grooves when the lid assembly is in the closed position relative to the cooker body.

17. The electric pressure cooker of claim 1, wherein the heat insulation member comprises a downward projecting portion to block the fingers of a user from contacting the inner pot.

18. The electric pressure cooker of claim 7, wherein the heat insulation member comprises a downward projecting portion to block the fingers of a user from contacting the inner pot.

* * * * *